United States Patent
Baker et al.

[11] Patent Number: 5,585,184
[45] Date of Patent: Dec. 17, 1996

[54] COLORABLE NON-STICKY RESIN CORE-SHELL PARTICLES

[75] Inventors: Edgar C. Baker, Bridgewater, N.J.; Jose F. Cevallos-Candau, Charleston, W. Va.; Eric A. Lucas, Somerville, N.J.; John G. Victor, La Canada, Calif.; Allen Noshay, East Brunswick, N.J.

[73] Assignee: Union Carbide Chemicals & Plastics Technology Corporation, Danbury, Conn.

[21] Appl. No.: 314,704

[22] Filed: Sep. 29, 1994

[51] Int. Cl.$^6$ .................. B32B 5/16; B32B 9/00; B32B 15/02; B32B 17/02
[52] U.S. Cl. .................. 428/407; 428/402; 428/403; 525/902; 523/200; 523/201; 523/207; 523/210
[58] Field of Search .................. 523/200, 201, 523/207, 210; 428/403, 407, 402; 525/902

[56] References Cited

U.S. PATENT DOCUMENTS

| | | | |
|---|---|---|---|
| 4,640,907 | 2/1987 | Best | 502/115 |
| 4,722,971 | 2/1988 | Datta et al. | 525/211 |
| 4,970,279 | 11/1990 | Bailly et al. | 526/88 |
| 4,994,534 | 2/1991 | Rhee et al. | 526/88 |
| 5,063,110 | 11/1991 | Bailly et al. | 428/402 |
| 5,087,522 | 2/1992 | Bailly et al. | 428/402 |
| 5,112,785 | 5/1992 | Brun et al. | 502/108 |
| 5,165,998 | 11/1992 | Bailly et al. | 428/407 |
| 5,208,303 | 5/1993 | Bailly | 526/125 |
| 5,304,588 | 4/1994 | Boysen et al. | 523/204 |
| 5,376,743 | 12/1994 | Baker et al. | 526/88 |
| 5,459,203 | 10/1995 | Geerts et al. | 525/902 |

FOREIGN PATENT DOCUMENTS 8802379 4/1988 WIPO.

Primary Examiner—Glenn A. Caldarola
Assistant Examiner—J. Pasterczyk
Attorney, Agent, or Firm—B. L. Deppenbrock

[57] ABSTRACT

A colorable resin particle having an outer shell of a non-sticky olefinic polymer having a flow index of less than 20 decigrams/minute and an inner core of at least 90 wt % of a sticky polymer, the resin particle being made in a gas phase fluidized bed reactor at or above the sticking temperature of the sticky polymer in the absence of an inert particulate material fluidization aid.

5 Claims, 2 Drawing Sheets

COLORABLE NON-STICKY RESIN CORE-SHELL PARTICLES

FIELD OF THE INVENTION

The invention relates to elastomeric ethylene/propylene rubbers (EPRs) such as ethylene/propylene copolymers (EPMs) and ethylene/propylene/diene terpolymers (EPDMs), which EPRs have a crystallinity of less than about 15 percent by weight, and their preparation. More particularly, the invention relates to a colorable non-sticky resin, a non-sticky prepolymerized catalyst and processes for making them.

BACKGROUND OF THE INVENTION

EPRs are produced commercially in solution and slurry processes with soluble vanadium catalysts. These processes are expensive to run because they require solvent removal and steam stripping steps.

The production of EPRs in a fluidized bed in a gas phase reaction process is advantageous because of the absence of large volumes of solvent or liquid monomer, the high heat removal capacity of the fluidized bed, the granular nature of the polymer which facilitates purging and post treatment, and the ability to control reaction concentrations over a wide range of conditions without limitations imposed by the solubility of reactants and catalysts.

However, a gas phase reaction process requires that the granular resin product be free-flowing and non-sticky. EPRs are often referred to as sticky polymers because they agglomerate forming sticky, granular resin bed particles under polymerization conditions or upon the cessation of gas phase polymerization. A sticky polymer has been defined as a polymer which, although particulate at temperatures below the sticking or softening temperature, agglomerates at temperatures at or above the sticking temperature. The sticking or softening temperature has been defined as the temperature at which fluidization ceases due to the agglomeration of particles of polymer in a fluidized bed. The agglomeration may be spontaneous or occur on short periods of settling.

Also, a polymer may be inherently sticky due to its chemical or mechanical properties or pass through a sticky phase during the production cycle. Sticky polymers have also been referred to as non-free flowing polymers because of their tendency to compact into aggregates of much larger size than the original particles and not to flow out of the relatively small openings in the bottom of the product discharge tanks or purge bins. Polymers of this type can show acceptable fluidity in a gas phase fluidized bed reactor; but, once motion ceases, the additional mechanical force provided by the fluidizing gas passing through the distributor plate is insufficient to break up the aggregates which form, and the bed will not re-fluidize.

Stickiness is even more critical with EPRs having a crystalline content of less than 15 percent by weight. Commercially desirable EPMs and EPDMs contain about 20 to about 55 percent by weight propylene and have a Mooney viscosity of about 20 to about 120. EPDMs additionally contain about 2 to about 15 percent by weight of a non-conjugated diene to further contribute to stickiness. Further, EPRs are practically amorphous and they have glass transition temperatures of minus 50° C. to minus 60° C. At temperatures above the glass transition temperature, EPMs and EPDMs are rubbers whose viscosity decreases, like all rubbers, exponentially with increases in temperature. The viscosity decrease with rising temperatures is a major obstacle in fluidized bed production of EPR because agglomeration increases as particle surface viscosity decreases. At temperatures above about 30° C., amorphous EPM particles become so sticky that fluidized bed polymerization cannot be carried out reliably. Particles comprising resin of lower molecular weight or lower Mooney viscosity are stickier than particles comprising resin of higher molecular weight or higher Mooney viscosity, and EPDM particles particles are even stickier than EPM due to the presence of soluble dienes.

Industry has generally solved tiffs problem of sticky polymers by avoiding polymerization at temperatures at or above the sticking temperature of the polymer. Such polymerization processes are disclosed, for example, in U.S. Pat. Nos. 5,087,522 and 5,208,303 and WO 88/02379.

U.S. Pat. Nos. 4,994,534 and 5,304,588 describe a method for overcoming the tendency of EPRs to become sticky during polymerization. In these patents, EPRs are produced in a fluidized bed using an alpha olefin polymerization catalyst such as a transition metal catalyst of vanadium and/or titanium and an inert particulate material. The EPRs are produced by polymerizing at or above the softening or sticking temperature of the polymer product. While this procedure is extremely effective and permits operation of the fluid bed above the sticking temperature of the polymer, it generally results in the final polymer product containing a relatively large amount (about 10 to 50 percent based on the total weight of the final polymer product) of the inert particulate material.

Use of inert particulate materials as fluidization aids in the amounts needed for fluid bed operations can also impart undesirable properties (mechanical or melt compounding difficulties) to the final product making them unsuitable for some end uses. For example, silica can be highly abrasive to the mixing equipment normally used with EPDM resins and can retard sulfur vulcanization. Carbon black always produces a black product, so that it cannot be used in markets in which a colorable resin is desired, such as rubber mechanical goods for some automotive use, oil viscosity improvers, or molded articles for consumer use. Furthermore, the inert particulate materials require storage vessels, feeding devices, special treatment to ensure dryness, and the use of additional co-catalyst beyond that required by the catalyst, all of which impose additional costs on the process.

U.S. Ser. No. 029,821 filed Mar. 11, 1993, now U.S. Pat. No. 5,376,793, describes another method for overcoming the sticky tendency of EPRs at or above the sticking temperature of the product resin by using a non-sticky prepolymer prepared by a prepolymerization conducted in a hexane slurry of ethylene and optionally a comonomer such that the comonomer content of the prepolymer ranges from about 0 to about 15 weight percent based upon the total weight of the monomers. According to the described process an inert particulate material can be incorporated into the prepolymer or introduced directly into the fluidized bed reactor independently of the prepolymer. Attempts to prepare EPR compositions high in propylene and low in molecular weight by this procedure results in a significant amount of prepolymer residue (up to 20 percent by weight based on the weight of the final polymer product) remaining in the product to prevent agglomeration during polymerization of the final polymer resin. Or, alternatively, substantial quantities of inert particulate material are added to the reactor during polymerization of the resin product. This procedure can result in undesirable levels of inert particulate material or catalyst residue in the product that can diminish final polymer product properties. Furthermore, the prepolymer residues in the product contain sufficient material that is still crystalline at temperatures as high as 120° C. such that properties of the final product can be adversely affected and end use applications limited.

Thus, a process which produces a non-agglomerating or non-sticky colorable resin, without feeding an inert particulate material to the polymerization reactor, having little or no inert particulate material in the final product, and still permitting operation of a gas phase reactor above the sticking temperature of the polymer being made, would be highly desirable. There is also an on-going need for amorphous, colorable sticky polymers, such as EPRs, produced at temperatures at or above their sticking temperatures in a gas phase polymerization, while at the same time reducing or eliminating the use of inert particulate matter. By colorable is meant that the resin is capable of producing an end product which accepts and/or exhibits a color other than black.

SUMMARY OF THE INVENTION

Figure 1A:
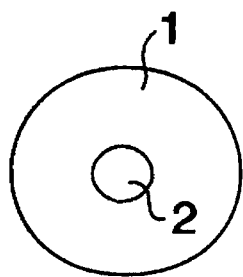
FIG. 1A is a schematic diagram of a non-sticky prepolymerized catalyst particle in which 1 is shell comprised primarily of prepolymer portion and 2 is core comprised primarily of catalyst portion.

Accordingly, the present invention provides a resin particle having (A) an outer shell that is at least about 80% by weight of a non-sticky polymer having (a) 10 to 90 mole % ethylene and having at least 10 mole % of one or more alpha olefins having 3 to 18 carbon atoms, and (b) a flow index of less than 20 decigrams/minute; and (B) an inner core of at least about 90% by weight of a sticky polymer;

said resin having at least about 1 percent by weight of said non-sticky polymer.

There is provided in another embodiment the above-mentioned non-sticky prepolymerized catalyst having a prepolymer portion and a catalyst portion wherein (1) the prepolymer portion has (a) 10 to 90 mole % ethylene and at least 10 mole % of one or more alpha olefins having 3 to 18 carbon atoms; and (b) a flow index of less than 20 decigrams/minute; and wherein (2) the ratio of the prepolymer portion to the catalyst portion is 25:1 to 1000:1.

Still another embodiment provides a process for the production of a resin having (A) an outer shell of a non-sticky polymer and (B) an inner core of a sticky polymer, which process comprises contacting ethylene, at least one alpha olefin having 3 to 18 carbon atoms, and optionally at least one diene, in a gas phase fluidized bed in the presence of hydrogen, at a temperature at or above the sticking temperature of the sticky polymer under polymerization conditions with (I) the above-mentioned non-sticky prepolymerized catalyst, (II) a co-catalyst, and (III) optionally a promoter, wherein the amount of non-sticky polymer is sufficient to essentially prevent agglomeration of the fluidized bed and of the sticky polymer.

Still other embodiments provide three prepolymerizing processes for preparing the non-sticky prepolymerized catalyst particles. One is a prepolymerization process for producing the above-mentioned non-sticky prepolymerized catalyst comprises contacting a prepolymerization catalyst in a slurry of inert solvent with ethylene and at least one alpha olefin, and optionally a diene, such that (i) the temperature of the slurry is maintained such that the prepolymer portion of the non-sticky prepolymerized catalyst is insoluble in the slurry;

(ii) the total feed rate of the ethylene and the alpha olefin is less than or equal to 500 grams of ethylene and alpha olefin per gram of catalyst per hour;

(iii) the ratio of ethylene to alpha olefin is maintained at a constant ratio of less than or equal to 9:1;

(iv) the process is terminated when the ratio of the prepolymer portion to catalyst portion of the non-sticky prepolymerized catalyst is 25:1 to 1000:1, by evaporating the solvent and unreacted ethylene and alpha olefin; and (v) optionally an inert particulated material is added to the slurry immediately prior to the terminating step.

Another prepolymerization process for producing the above-mentioned non-sticky prepolymerized catalyst comprises contacting a prepolymerization catalyst precursor in a slurry of liquid ethylene and propylene, and optionally a diene, with a co-catalyst such that (i) the rate of prepolymerization is less than or equal to 500 grams ethylene and propylene per gram catalyst precursor per hour;

(ii) the slurry is maintained at a constant pressure of at least 300 psia;

(iii) the process is terminated when the ratio of the prepolymer portion to catalyst portion of the non-sticky prepolymerized catalyst is 25:1 to 1000:1 by purging the unreacted ethylene and alpha olefin; and (iv) optionally an inert particulate material is added to the slurry immediately prior to the terminating step.

A third prepolymerization process for producing the above-mentioned non-sticky prepolymerized catalyst comprises charging a prepolymerization catalyst, ethylene, and an alpha olefin, and optionally a diene, in a gas phase stirred reactor (i) at a temperature below the sticking temperature of the prepolymer portion of the non-sticky prepolymerized catalyst, (ii) such the total feed rate of the ethylene and the alpha olefin is less than or equal to 500 grams ethylene and alpha olefin per gram of catalyst per hour; and such that (iii) the ratio of ethylene to alpha olefin is maintained at a constant ratio of less than or equal to 9:1;

(iv) terminating the process by purging unreacted ethylene and alpha olefin; and (v) optionally an inert particulate material is added initially to the reactor.

DETAILED DESCRIPTION OF THE INVENTION

The resin composition of the present invention is produced by polymerizing ethylene, at least one alpha olefin, and a polymerization co-catalyst in the presence of a non-sticky prepolymerized catalyst particles in a fluidized bed operated in the gas phase at or above the sticking temperature of the final sticky resin polymer product being produced. Optionally the polymerization can include a diene, a chain transfer agent, and a promoter.

The non-sticky prepolymerized catalyst particles can be prepared using any of the following prepolymerization processes: (1) a gas phase prepolymerization, (2) a slurry prepolymerization using an inert diluent, or (3) a slurry prepolymerization using a monomer as a diluent. These prepolymerization processes employ ethylene, at least one alpha olefin, and a prepolymerization catalyst (which includes a catalyst precursor, co-catalyst, and optional promoter and/or other modifiers). Optionally these prepolymerization processes can include a diene, a chain transfer agent, and an inert particulate material.

Prepolymerization Catalysts

The prepolymerization catalysts employed in prepolymerization processes of this invention are composed of a catalyst precursor, co-catalyst, and optionally a promoter.

Catalyst precursor compounds that can be used in the prepolymerization processes of the present invention include transition metal compounds from Groups IIB–VIII of the Periodic Table of the Elements. Among the preferred transition metal compounds are compounds from Groups IVB–VIB. Catalyst precursors can include vanadium compounds, titanium compounds, chromium compounds, and metallocenes. These compounds may be supported or unsupported. Each transition metal compound is generally employed along with co-catalyst and promoter which are associated with that particular catalyst precursor. Preferred among these precursors are vanadium and titanium precursors.

Vanadium compounds which can be used to practice the prepolymerization processes of the present invention are vanadium salts or the reaction product of a vanadium salt and an electron donor. Of course, mixtures of these compounds may also be used. Non-limiting, illustrative examples of these compounds are as follows:

A. vanadyl trihalide, alkoxy halides and alkoxides such as $VOCl_3$, $VOCl_2(OR)$ wherein R is an alkyl having 1 to 12 carbon atoms, and $VO(OC_xH_y)_3$ wherein $x$ is 1 to 12 and $y$ is x+3.

B. vanadium tetrahalide and vanadium alkoxy halides such as $VCl_4$ and $VCl_3(OR)$ wherein R is an alkyl having 1 to 12 carbon atoms.

C. vanadium and vanadyl acetylacetonates and chloracetyl acetonates such as $V(AcAc)_3$ and $VOCl_2(AcAc)$ wherein (AcAc) is an acetyl acetonate.

D. vanadium trihalides and alkoxy halides, such as $VCl_3$ and $VCl_2(OR)$ wherein R is an alkyl having 1 to 12 carbon atoms.

The electron donor, if used with the vanadium compound, is an organic Lewis base in which the vanadium compound is soluble. It can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Examples include ethylacetate, butyl acetate, ethyl ether, dibutyl ether, methyl acetate and tetrahydrofuran.

Modifiers can also optionally be used with these vanadium catalyst systems. A modifier can have the formula $AlR_{(3-a)}Xa$ or $BX_3$ or $SiX_4$ wherein each R is independently an alkyl radical having 1 to 14 carbon atoms; each X is independently chlorine, bromine or iodine; and $a$ is an integer from 0 to 2. Preferred modifiers include alkylaluminum mono and dichlorides, $BCl_3$, and the trialkylaluminums. Examples include diethylaluminum chloride, triethylaluminum and boron trichloride. The molar ratio of modifier to vanadium is in the range of about 1:1 to about 10:1.

Co-catalysts utilized with vanadium compounds consist essentially of an alkyl alumimun halide having the formula $AlR_{(3-a)}X_a$, wherein each R is independently alkyl having 1 to 14 carbon atoms, each X is independently chlorine, bromine or iodine, and $a$ is 1 or 2, or a trialkylaluminum compound having the formula $AlR_3$, wherein R is the same as above. Alkylaluminum halides falling within the above formula include alkylaluminum mono and dichlorides wherein each alkyl radical has 1 to 6 carbon atoms. Examples include diethylaluminum chloride, ethylaluminum dichloride, ethylaluminum sesquichloride, dimethylaluminum chloride, methylaluminum dichloride, diisobutyl aluminum chloride and isobutylaluminum dichloride. Examples of trialkylaluminum compounds include trihexylaluminum, trimethylaluminum, triethylaluminum, triisobutylaluminum and trioctylaluminum.

The optional promoter utilized with vanadium catalyst precursors can be a chlorinated ester having at least 2 chlorine atoms or a perchlorinated ester. Suitable esters are $Cl_3CCOOC_2H_5$ (ethyl trichloroacetate), $Cl_3CCOOCH_3$ (methyl trichloroacetate), $CCl_3CCl=CClCOOC_4H_9$ (butyl perchlorocrotonate), and $Cl_2C=CClCCl_2COOC_4H_9$ (butyl perchloro-3-butenoate). The promoter can also be a saturated aliphatic hydrocarbon of formula $R_yCX_{(4-y)}$ wherein R is hydrogen or an unsubstituted or halogen-substituted alkyl radical having 1 to 6 carbons, each X is independently fluorine, chlorine, bromine or iodine and $y$ is an integer from 0 to 2. Examples include methylene dichloride, 1,1,1-trichloroethane, chloroform, $CFCl_3$, hexachloroethane, and $F_2ClCCCl_3$ (1,1-difluorotetrachloroethane). The promoter can also be a saturated aliphatic halocarbon having the formula $C_3X_aF_bH_c$ wherein each X is independently chlorine, bromine or iodine, $a$ is an integer from 6 to 8, $b$ and $c$ are integers from 0 to 2, and $a+b+c$ equals 8. Examples include hexachloropropane, heptachloropropane and octachloropropane. These saturated halocarbon promoters are mentioned in U.S. Pat. No. 4,892,853. In addition, the promoter can also be an unsaturated aliphatic halocarbon such as perchloropropylene or any unsaturated halocarbon having a $CX_3$ group attached to a C=C group wherein each X is independently chlorine, bromine or iodine or a haloalkyl substituted aromatic hydrocarbon wherein the haloalkyl substituent has at least 3 halogen atoms, such as trichlorotoluene or trichloroxylene.

Supporting the catalyst precursor is preferred, and when the catalyst precursor is supported the preferred support is silica. Other suitable supports are inorganic oxides such as aluminum phosphate, alumina, silica/alumina mixtures, silica modified with an organoaluminum compound such as triethylaluminum, and silica modified with diethylzinc. Examples of polymeric supports are cross-linked polystyrene and polypropylene. A typical support is a solid, particulate, porous material essentially inert to the prepolymerization. It is used as a dry powder having an average particle size of about 10 to about 250 microns and preferably about 30 to about 100 microns; a surface area of at least about 200 square meters per gram and preferably at least 250 square meters per gram; and a pore size of at least about 100 Angstroms and preferably at least about 200 Angstroms. Generally, the amount of support used is that which will provide about 0.1 to about 1.0 millimole of transition metal per gram of support. Impregnation of the above-mentioned catalyst precursor transition metal compound into a silica support is accomplished by mixing the compound and silica gel in an appropriate solvent in which the compound is soluble followed by solvent removal under reduced pressure. Spray-drying technology can also be used to generate well-shaped catalyst precursors having little or no silica or other inorganic solids content.

The preferred vanadium compounds are V(AcAc)$_3$, VCl$_3$, VOCl$_3$, VCl$_4$, and VO(OR)$_3$ wherein R is a hydrocarbon radical, preferably a C$_1$ to C$_{10}$ aliphatic or aromatic hydrocarbon radical such as ethyl, phenyl, isopropyl, butyl, propyl, n-butyl, i-butyl, t-butyl, hexyl, cyclohexyl, naphthyl, and so forth and electron donor complexes of these vanadium compounds. Such catalysts are described, for example, in U.S. Pat. Nos. 4,508,842, 5,342,907 and 5,332,793.

Suitable titanium compounds for use in the present invention include catalyst precursors having the formula Mg$_a$·Ti(OR)$_b$X$_c$(ED)$_d$ wherein R is independently an aliphatic or aromatic hydrocarbon radical having 1 to 14 carbon atoms or COR' wherein R' is an aliphatic or aromatic hydrocarbon radical having 1 to 14 carbon atoms; X is independently chlorine, bromine or iodine; ED is an electon donor; $\underline{a}$ is 0.5 to 56; $\underline{b}$ is an integer from 0 to 2; $\underline{c}$ is 2 to 116; and $\underline{d}$ is 2 to 85. Titanium compounds which are useful in preparing these precursors have the formula Ti(OR)$_b$X$_e$ wherein R, X and $\underline{b}$ are as defined above, $\underline{e}$ is an integer from 1 to 4, and $\underline{b+e}$ is 3 or 4. Examples include TiCl$_3$, TiCl$_4$, Ti(OC$_2$H$_5$)$_2$Br$_2$, Ti(OC$_6$H$_5$)Cl$_3$ and Ti(OCOCH$_3$)Cl$_3$. These titanium-based catalysts and their method of preparation are disclosed more fully in U.S. Pat. No. 4,302,565.

Electron donors, modifiers, supports, co-catalysts and promoters can be used with titanium-based catalysts in the same manner as for vanadium, and are the same as those described above for vanadium. The particular combination of electron donor, modifier, co-catalyst, and promoter are chosen from those known to those skilled in the art of polymerization to be most efficacious for the particular catalyst precursor.

Chromium compounds which are suitable for use in the present invention include chromyl chloride (CrO$_2$Cl$_2$), chromium 2-ethylhexanoate, chromium acetylacetonate (Cr(AcAc)$_3$), and the like which are disclosed in, for example, U.S. Pat. Nos. 3,242,099 and 3,231,550.

Metallocenes which can be employed in the invention include catalyst compositions comprising at least one metallocene catalyst, at least one co-catalyst, and particulate filler material having an average particle size of less than about 10 micrometers. The particulate filler material is unreactive with both the metallocene catalyst and the co-catalyst.

One useful class of metallocene catalysts are organometallic compounds containing at least one cyclopentadienyl group bonded to a Group IIIB to VIII metal, such as mono, di-, and tricyclopentadienyls and their derivatives of these transition metals.

A preferred metallocene catalyst containing at least one cyclopentadienyl group bonded to a Group IIIB to VIII metal has the formula:

$$(C_5R_n)_yR'_z(C_5R_m)MY_{(x-y-1)} \quad (1)$$

wherein M is a metal from Groups IIIB to VIII of the Periodic Table; (C$_5$R$_n$) and (C$_5$R$_m$) are independently cyclopentadienyl or substituted cyclopentadienyl groups bonded to M; each R is independently hydrogen or a hydrocarbyl radical such as alkyl, alkenyl, aryl, alkylaryl, or arylalkyl radical containing from 1 to 20 carbon atoms, or two carbon atoms are joined together to form a C$_4$–C$_6$ ring; each R' is a C$_1$–C$_4$ substituted or unsubstituted alkylene radical, a dialkyl or diaryl germanium or silicon, or an alkyl or aryl phosphine or amine radical bridging two (C$_5$R$_n$) and (C$_5$R$_m$) tings; each Y is independently a hydrocarbyl radical such as aryl, alkyl, alkenyl, alkylaryl, or arylalkyl radical having from 1–20 carbon atoms, hydrocarboxy radical having from 1 to 20 carbon atoms, or halogen; n and m are each 0, 1, 2, 3, or 4; $\underline{z}$ is 0 or 1, and $\underline{z}$ is 0 when $\underline{y}$ is 0; $\underline{y}$ is 0, 1, or 2; $\underline{x}$ is 1, 2, 3, or 4 depending upon the valence state of M; and $\underline{x-y} \geq 1$.

Illustrative, but non-limiting examples, of metallocene catalysts of Formula 1 are dialkyl metallocenes such as bis(cyclopentadienyl)titanium dimethyl, bis(cyclopentadienyl)zirconium dimethyl; the mono alkyl metallocenes such as bis(cyclopentadienyl)zirconium methyl chloride; the trialkyl metallocenes such as cyclopentadienyl titanium trimethyl; silicon, phosphine, amine or carbon bridged metallocene compounds such as isopropylidene(cyclopentadienyl)(fluorenyl)zirconium dichloride, diphenylmethylene(cyclopentadienyl)(fluorenyl) zirconium dichloride, rac-ethylenebis(indenyl)zirconium dichloride.

A more preferred metallocene catalyst containing at least one cyclopentadienyl group bonded to a Group IIIB to VIII metal is a bridged metallocene having the formula:

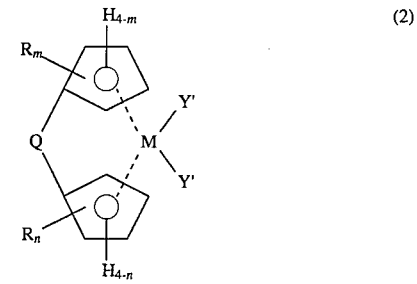

(2)

wherein:

Q is a bridging linkage selected from

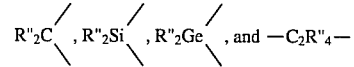

wherein each R" moiety is independently H or an alkyl group, or two R" moieties are joined to form a ring structure. Preferably, when an R" moiety is an alkyl group, it contains 3 to 8 carbon atoms, and when two R" moieties are joined to form a ring structure with the atom or atoms to which they are respectively attached, a 5 or 6-membered ring is formed. The subscripts $\underline{m}$ and $\underline{n}$ are each 0, 1, 2, 3, or 4, and the sum of $\underline{m}$ and $\underline{n}$ is preferably 2 to 6. The metal M is a Ti, Zr, or Hf atom, preferably Zr. Each Y' is independently H, an alkyl group, or a halogen atom.

In bridged metallocenes, the cyclic π-bonded moieties may bear one or more substituents R. Each R moiety is independently an alkyl, cycloalkyl, alkenyl, cycloalkenyl, phenyl, alkyl-substituted phenyl, or a phenyl-substituted alkyl group, or two adjacent R groups on a given ring are joined to form a second ring. Preferably, each R moiety is independently an alkyl or cycloalkyl group of 3 to 8 carbon atoms, an alkenyl group of 2 to 8 carbon atoms, a cycloalkenyl group of 5 to 8 carbon atoms, phenyl, an alkyl-substituted phenyl group in which the alkyl group contains 3 to 8 carbon atoms, a phenyl-substituted alkyl group in which the alkyl portion contains 1 to 4 carbon atoms, or two adjacent R groups on a given ring are joined and together with the carbon atoms to which they are respectively attached form a saturated or unsaturated 4, 5, or 6-membered ring.

Illustrative but non-limiting examples of bridged metallocenes of Formula (2) that may be used as the metallocene catalyst are rac-ethylenebis(indenyl)zirconium dichloride and rac-ethylenebis(4,5,6,7-H-tetrahydroindenyl)zirconium dichloride.

Another class of useful metallocene catalysts are constrained geometry metallocenes as described in PCT Publication No. WO 93/08221.

Preferred constrained geometry metallocenes have the formula:

(3)

wherein M' is a metal of Groups IIIB–VIII or the Lanthanide series of the Periodic Table; $Cp^*$ is a cyclopentadienyl or substituted cyclopentadienyl group bound in an $h^5$ bonding mode to M'; Z is a moiety comprising boron or a member of Group IVa of the Periodic Table, and optionally sulfur or oxygen, said moiety having up to 20 non-hydrogen atoms, and optionally $Cp^*$ and Z together form a fused ring system; each X is independently an anionic ligand group or neutral Lewis base ligand group having up to 30 non-hydrogen atoms; $n'$ is 1, 2, 3, or 4 and is 2 less than the valence of M'; and Y" is an anionic or nonionic ligand group bonded to Z and M' comprising nitrogen, phosphorus, oxygen, or sulfur and having up to 20 non-hydrogen atoms, optionally Y" and Z together form a fused ring system.

Illustrative, but non-limiting examples, of preferred constrained geometry metallocenes include (tert-butylamido)(tetramethyl-$h^5$-cyclopentadienyl)-1,2-ethanediylzirconium dichloride and (methylamido)(tetramethyl-$h^5$-cyclopentadienyl)-1,2-ethanediyltitanium dichloride.

The co-catalyst is capable of activating the metallocene catalyst, and may be one of the following: (a) branched or cyclic oligomeric poly(hydrocarbylaluminum oxide)s which contain repeating units of the general formula —(Al(R''')O)—, where R''' is hydrogen, an alkyl radical containing from 1 to about 12 carbon atoms, or an aryl radical such as a substituted or unsubstituted phenyl or naphthyl group; (b) ionic salts of the general formula $[A^+][BR^*_4-]$, where $A^+$ is a cationic Lewis or Bronsted acid capable of abstracting an alkyl, halogen, or hydrogen from the bridged metallocene catalyst, B is boron, and $R^*$ is a substituted aromatic hydrocarbon, preferably a perfluorophenyl radical; and (c) boron alkyls of the general formula $BR^*_3$, where $R^*$ is as defined above.

Preferably, the co-catalyst employed with the metallocene catalyst is a branched or cyclic oligomeric poly(hydrocarbylaluminum oxide). More preferably, the co-catalyst is an aluminoxane such as methylaluminoxane (MAO) or modified methylaluminoxane (MMAO).

Aluminoxanes are well known in the art and comprise oligomeric linear alkyl aluminoxanes represented by the formula:

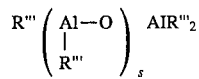

and oligomeric cyclic alkyl aluminoxanes of the formula:

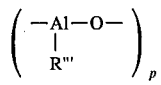

wherein $\underline{s}$ is 1 to 40, preferably 10 to 20; $\underline{p}$ is 3 to 40, preferably 3 to 20; and R''' is an alkyl group containing 1 to 12 carbon atoms, preferably methyl or an aryl radical such as a substituted or unsubstituted phenyl or naphthyl radical.

The metallocene catalyst composition may optionally contain one or more second catalysts. These second catalysts include for example any Ziegler-Natta catalysts containing a metal from Groups IV(B), V(B), or VI(B) of the Periodic Table. Suitable activators for Ziegler-Natta catalysts are well known in the art and may also be included in the catalyst composition.

The filler material is selected from organic and inorganic compounds that are inert to the co-catalyst and the metallocene catalyst. Examples include alumina, titanium dioxide, polystyrene, rubber modified polystyrene, polyethylene, polypropylene, magnesium chloride, and silicon dioxide such as fumed silica. Such fillers may be used individually or in combinations. The filler material has an average particle size of less than about 10 micrometers, preferably less than about 1 micrometer, and most preferably has an average particle size in the range of about 0.001 to about 0.1 micrometers.

Alpha Olefins

All three of these prepolymerization processes and the polymerization process for making the final resin composition employ ethylene and at least one alpha olefin have 3 to 18 carbon atoms. These alpha olefins can be linear or branched. Illustrative, but non-limiting examples of these alpha olefins, include propylene, butene-1, isobutene, pentene-1, octene, decene-1, dodecene-1, tetradecene-1, hexadecene-1, octadecene-1, and mixtures thereof. Preferred alpha olefins have 3 to 12 carbon atoms. These alpha olefins are preferably selected from the group consisting of propylene, butene-1, pentene-1, hexene-1, 4-methyl-1-pentene and octene-1. Most preferably the alpha olefins have 3 to 6 carbon atoms and of these propylene, butene-1 and hexene-1 are especially preferred.

Dienes

Sticky polymers produced in the invention can optionally contain non-conjugated dienes. Both the non-sticky prepolymerized catalyst and the final resin composition can contain one or more of such dienes. It is preferred that dienes not be incorporated into the non-sticky prepolymerized catalyst since they have a tendency to exacerbate agglomeration. Preferably all or most of the diene is added during the polymerization of the final resin to produce a sticky EPDM. These non-conjugated diene monomers used to produce EPDMs may be straight chain, branched chain or cyclic hydrocarbon dienes having from about 5 to about 15 carbon atoms. Examples of suitable non-conjugated dienes are straight chain acyclic dienes such as 1,4-hexadiene, 1,5-hexadiene, 1,7-octadiene, 1,9-decadiene and 1,6-octadiene. Illustrative branched chain acyclic dienes include such as 5-methyl-1,4-hexadiene, 3,7-dimethyl-1,6-octadiene, 3,7-dimethyl-1,7-octadiene and mixed isomers of dihydromyricene and dihydrocinene. Single ring alicyclic dienes can include, for example, 1,3-cyclopentadiene, 1,4-cyclohexadiene, 1,5-cyclooctadiene and 1,5-cyclododecadiene. Illustrative multi-ring alicyclic fused and bridged ring dienes such as tetrahydroindene, methyl tetrahydroindene, dicyclopentadiene, bicyclo(2,2,1)-hepta-2,5-diene, alkenyl, alkylidene, cycloalkenyl and cycloalkylidene norbornenes such as 5-methylene-2-norbornene, 5-propenyl-2-norbornene, 5-iso-propylidene-2-norbornene, 5-(4-cyclopentenyl)-2-norbornene, 5-cyclohexylidene-2-norbornene, 5-vinyl-2-norbornene and norbornadiene can be employed in the process of the present invention. Dienes which are especially preferred include 1,4-hexadiene, and 5-ethylidene-2-norbornene. While a portion of one or more of these dienes can be incorporated into the non-sticky prepolymerized catalyst, preferably the diene, or bulk of the amount of diene, is incorporated into the resin particle composition in the gas phase polymerization described below. The amount of diene in the prepolymerized catalyst ranges from about 0 to about 5 percent by weight based upon the weight of the prepolymer portion of the catalyst, and amount of diene in final resin composition is about 0 to about 15 percent by weight based upon the weight of the sticky polymer in the resin.

Chain Transfer Agents

A chain transfer agent, such as hydrogen or a metal alkyl (e.g., diethyl zinc) are normally used in polymerizations to control molecular weight. They can be employed during the prepolymerization processes and the polymerization process of this invention. Such transfer agents are well known in the art and are used in the normal manner in the polymerization of the resin product herein. When a chain transfer agent is used in a prepolymerization process, it is preferably added after prepolymerization is initiated and gradually increased in concentration to produce the desired non-sticky prepolymerized catalyst.

Inert Particulate Material

Optionally, inert particulate material, also referred to as a fluidization aid, can be employed in the prepolymerization process of the present invention. When employed in the gas phase prepolymerization process, the inert particulate material preferably is added in the initial charge to aid in bed fluidization. In slurry prepolymerization processes, it is preferred to add the fluidization aid immediately prior to or simultaneously with evaporating the solvent and/or excess monomers. Suitable inert particulate materials are disclosed, for example, in U.S. Pat. Nos. 4,994,534 and 5,304,588. They include carbon black, silica, talc, and clay. Preferred materials are silica, talc and clay with silica being most preferred. When employed, the inert particulate material is about 0.05 to about 50 weight percent of the non-sticky prepolymerized catalyst particle, preferably about 0.05 to about 20 weight percent. In the final resin composition, when employed, the inert particulate material ranges from about 0.05 to about 30 wt % based upon the weight of the final resin product, and preferably is about 0.3 to about 10 wt %. Most preferably, inert particulate material is not employed in the present invention.

Methods for Preparing the Non-sticky Prepolymerized Catalyst (Prepolymerization Processes)

The non-sticky prepolymerized catalyst of the present invention must be prepared in such a way that it is non-sticky itself, provides agglomeration protection for the sticky polymer in the resin product, and doesn't detract from the properties of the final resin product. This is accomplished by prepolymerizing a catalyst precursor under controlled conditions to produce a prepolymerized catalyst having particles of a specific composition. The particles can be prepared in either (1) a gas phase prepolymerization, (2) a slurry prepolymerization using an inert hydrocarbon as a diluent, or (3) a slurry prepolymerization using liquified monomers as a diluent by controlling the rate of prepolymerization, controlling the monomer feed composition, and controlling the quantity of the prepolymer portion produced.

The prepolymerization is conducted in a stirred gas phase reactor, a fluidized bed gas phase reactor or a stirred slurry reactor, as appropriate. The reactor is operated in batch mode, or, if continuous, in a uniform residence time mode.

Rate of Prepolymerization

In order to produce non-sticky prepolymerized catalyst particles with most of the prepolymer portion on the outside of the particle, and most of the catalyst portion within the core of the particle, it is desirable that the prepolymerization be conducted under conditions that limit the rate of the prepolymerization. Since the rate of a polymerization is well-known to be a function of co-catalyst concentration, one way to accomplish this is to limit the amount of co-catalyst available. By feeding only the minimum level of co-catalyst needed to sustain a reaction, the co-catalyst feed rate will be rate-limiting, and the reaction rate will be controlled by this feed rate. While this level will vary from one catalyst system to another, it will normally be from about $1/100$ to about $1/2$ of the normal amount of co-catalyst needed for full catalyst activity, or a mole ratio of co-catalyst to transition metal in the catalyst precursor of about 0.1:1 to about 10:1.

Since the rate of a polymerization is also well-known to depend on the ethylene partial pressure, another way to control the rate of polymerization is to control the ethylene partial pressure at a low value. Ethylene partial pressures in the range of 2 to 200 psia can be used to limit the production rate to the desired value.

Still another way to control the rate of a polymerization is to limit the flow of monomers to the reactor to the desired production rate. The ethylene partial pressure will then change as catalyst activity changes either from one catalyst system to another or in the course of polymerization, but the production rate will be fixed by the feed rate.

The prepolymerization rate should be limited to about 1 to about 500 grams of total monomers (ethylene plus alpha olefin) per gram of catalyst per hour, preferably about 5 to about 300 grams, most preferably about 10 to about 200 grams.

Control of Composition

Another important aspect of the prepolymerization process involves controlling the composition of the prepolymer portion of the prepolymerized catalyst being produced. This composition is controlled by the balance between the monomers fed to the reactor and the monomers consumed in the prepolymerization. As long as the amount of monomers consumed in the prepolymerization is much greater than the amount of monomers that remain unpolymerized at the end of the prepolymerization, mass balance requires that the average composition of the prepolymer portion closely reflect the average composition of the monomer feed during the prepolymerization. Thus controlling the feed composition provides a simple method for controlling the average composition of the prepolymer.

In addition, controlling the feed composition provides a method to introduce a composition gradient into the prepolymer portion of the prepolymerized catalyst. It is well-known in the art that olefin polymerization catalysts react more rapidly with ethylene than higher alpha-olefins. Thus, when a constant feed composition is supplied to a catalyst, the first material polymerized will have a composition that has a higher ethylene content than the composition being fed. However, because the average composition over time must reflect the composition of the feed, as indicated above, the composition of the prepolymer portion being produced during the prepolymerization gradually becomes more enriched in alpha olefin as the prepolymerization proceeds. This generates a composition gradient in alpha olefin content.

Prepolymerization in liquified monomers requires a different means of control of composition. The composition of the monomers in the slurry medium is determined by the respective vapor pressures of the monomers, according to Henry's Law. Thus, in any volume of liquified ethylene/propylene mixture, the amount of ethylene dissolved is a function only of the pressure of ethylene over the slurry. If this pressure is held constant, the concentration of ethylene in the slurry will be constant, and the composition of the prepolymer portion of the prepolymerized catalyst produced will be constant. If it is desired to change that composition during the prepolymerization, it is necessary only to adjust the ethylene pressure that is maintained over the slurry.

Gas Phase Prepolymerization Process

An initial bed is normally charged to a gas phase reactor for dispersing a catalyst charge and maintaining agitation. When used, the bed can be a granular polymer, an inert particulate material such as sodium chloride granules, an inorganic oxide, such as Davison 955 silica, or an inert particulate material as described above, such as HiSil 233 silica available from PPG. Of course any bed material added to the reactor must be thoroughly dry and free from water or moisture. This is accomplished using well known techniques such as purging with hot nitrogen gas or calcination.

A catalyst precursor is charged to the reactor containing the bed. A co-catalyst and promoter are preferably added separately neat or as a solution in an inert solvent, such as isopentane. The prepolymerization catalyst is then contacted with ethylene and at least one alpha olefin or at least one alpha olefin and diene, as previously described. The ethylene, alpha olefin, and optional diene can each be added separately to the reactor, or as a mixture. They may be added continuously or intermittently both as individual components or as the mixture.

Whether added as a mixture or separately, the ethylene and alpha olefin are fed to the reactor in a controlled ratio. The ratio should be essentially the same as the desired ratio of ethylene to alpha olefin in the non-sticky prepolymerized catalyst to be produced. For example, if it is desired that the prepolymerized catalyst contain 20 mole % propylene, then the feed should contain 20 mole % propylene. The ethylene and alpha olefin should be fed such that the ethylene is less than about 90 mole % of the total amount of ethylene and alpha olefin in the feed, preferably less than about 85 mole % of the total amount of ethylene and alpha olefin in the feed.

Optionally, a chain transfer agent, can also be employed. Hydrogen is the preferred chain transfer agent. When used, it can be added at any time during the prepolymerization. However, it is preferable that no chain transfer agent be present at the initiation of prepolymerization. Rather, it is added after prepolymerization has begun and gradually increased until the concentration in the reactor is such as to instantaneously produce prepolymer having a flow index up to 20 decigrams per minute, preferably up to 5 decigrams/minute, most preferably 2 or less.

Throughout the prepolymerization process, the temperature is maintained below the sticking temperature of the prepolymer portion of the non-sticky prepolymerized catalyst. This temperature will depend on the composition of the non-sticky prepolymerized catalyst, and the degree of crystallinity of the prepolymer portion. Typically, the temperature of the prepolymerization is less than about 80° C., and preferably less than about 50° C.

The prepolymerization is conducted under conditions that limit the rate of the prepolymerization. This rate can be controlled by using individually or in combination any of the methods set forth above. Preferable are limiting the amount of co-catalyst or limiting the monomer feed rate.

When the weight ratio of the resulting prepolymer portion to catalyst portion is about 25:1 to about 1000:1, preferably 50:1 to about 500:1, and most preferably about 100:1 to about 300:1, the prepolymerization is terminated by purging the residual monomers from the reactor, thereby leaving the non-sticky prepolymerized catalyst as a free-flowing solid powder to be removed from the reactor.

Slurry Process in an Inert Hydrocarbon Diluent.

An inert hydrocarbon is charged to a stirred slurry reactor as the slurry medium. The inert hydrocarbon can be any saturated, linear or branched, hydrocarbon having 2 to 8 carbon atoms. Illustrative but non-limiting examples include ethane, propane, n-butane, isobutane, n-pentane, isopentane, n-hexane, isohexane, n-heptane, n-octane or isooctane. Preferably the diluent has 2 to 4 carbon atoms, and most preferably the diluent is ethane, propane, isobutane, or mixtures thereof. The amount of hydrocarbon used for the slurry is such that the amount of monomers dissolved in the hydrocarbon is small compared to the amount of non-sticky prepolymerized catalyst produced. However, the amount of diluent must be sufficient to allow efficient mixing of the slurry and to provide sufficient heat transfer capability to remove the heat of prepolymerization. Thus, the amount of diluent employed is about 0.001 to about 1 liters per gram of non-sticky prepolymerized catalyst to be produced, preferably about 0.002 to about 0.1 liters per gram of non-sticky prepolymerized catalyst, and most preferably about 0.003 to 0.01 liters per gram of non-sticky prepolymerized catalyst.

A catalyst precursor is charged to the reactor containing the slurry medium. A co-catalyst and promoter are preferably added separately neat or as a solution in an inert solvent, such as isopentane. The prepolymerization catalyst is then contacted with ethylene and at least one alpha olefin or at least one alpha olefin and diene as previously described. The ethylene, alpha olefin, and optional diene can each be added separately to the reactor, or as a mixture. They may be added continuously or intermittently both as individual components or as the mixture.

Whether added as a mixture or separately, the ethylene and alpha olefin are fed to the reactor in a controlled ratio. The ratio should be essentially the same as the desired ratio of ethylene to alpha olefin in the non-sticky prepolymerized catalyst particle to be produced. For example, if it is desired that the prepolymerized catalyst particle contain 20 mole % propylene, then the feed should contain 20 mole % propylene. The ethylene and alpha olefin should be fed such that the ethylene is never less than about 90 mole % of the total amount of ethylene and alpha olefin in the feed, preferably less than about 85 mole % of the total amount of ethylene and alpha olefin in the feed.

Optionally, a chain transfer agent can also be employed. Hydrogen is the preferred chain transfer agent. When used, it can be added at any time during the prepolymerization. However, it is preferable that no chain transfer agent be present at the initiation of prepolymerization. Rather, it is added after prepolymerization has begun and gradually increased until the concentration in the reactor headspace is such as to instantaneously produce polymer having a flow index up to 20 decigrams per minute, preferably up to 5 decigrams/minute, most preferably 2 or less.

Throughout the prepolymerization process, the temperature is maintained low enough such that the non-sticky prepolymerized catalyst is not appreciably soluble in the inert saturated hydrocarbon solvent. This temperature will depend on the composition of the prepolymer portion of the non-sticky prepolymerized catalyst, the degree of crystallinity of the prepolymer portion being made, and type of solvent employed for the slurry. Typically, the temperature of the prepolymerization is less than about 80° C., and preferably less than about 50° C.

The prepolymerization is conducted under conditions that limit the rate of the prepolymerization. This rate can be controlled by using individually or in combination any of the three methods set forth previously. Preferable are limiting the amount of co-catalyst and optional promoter or limiting the ethylene and alpha olefin feed rate.

When the weight ratio of the resulting prepolymer portion to catalyst portion is about 25:1 to about 1000:1, preferably 50:1 to about 500:1, and most preferably about 100:1 to about 300:1, the prepolymerization is terminated by evaporating the hydrocarbon and purging the residual monomers from the reactor, thereby leaving the non-sticky prepolymerized catalyst as a free-flowing solid powder to be removed from the reactor.

Slurry Process in Liquified Monomers

Liquified propylene is charged to a stirred slurry reactor as the slurry medium. A catalyst precursor is charged to the reactor containing the slurry medium.

Ethylene is charged to the reactor to a desired pressure such that the ethylene/propylene composition of the slurry produces prepolymerized catalyst of at least 10 mole percent propylene, preferably 15 mole percent. Of course, the pressure required is dependent upon the temperature of the prepolymerization, the composition of the non-sticky prepolymerized catalyst desired, and the specific catalyst employed. In general, however, the pressure ranges from about 150 psia to about 1000 psia, preferably about 300 psia to about 750 psia, and most preferably about 400 psia to about 500 psia, and is readily calculable by those skilled in the art. The slurry of liquified ethylene/propylene and catalyst precursor is then contacted with co-catalyst and optional promoter. Ethylene is fed on demand to the reactor during the prepolymerization in order to maintain the desired partial pressure of ethylene in the reactor.

Optionally, a chain transfer agent, can also be employed. Hydrogen is the preferred chain transfer agent. When used, it can be added at any time during the prepolymerization. However, it is preferable that no chain transfer agent be present at the initiation of prepolymerization. Rather, it is added after polymerization has begun and gradually increased until the concentration in the reactor is such as to instantaneously produce polymer having a flow index up to 20 decigrams per minute, preferably up to 5 decigrams/minute, most preferably 2 or less.

Throughout the prepolymerization process, the temperature is maintained low enough such that the non-sticky prepolymerized catalyst particle is not appreciably soluble in the slurry medium. This temperature will depend on the composition of the non-sticky prepolymerized catalyst particle and the degree of crystallinity of the particle being made. Typically, the temperature of the prepolymerization is less than about 80° C., and preferably less than about 50° C.

The prepolymerization is conducted under conditions that limit the rate of the prepolymerization. The rate of the prepolymerization can only be limited in this process by the method of limiting the supply of cocatalyst and optional promoter.

When the weight ratio of the resulting prepolymer portion to catalyst portion is about 25:1 to about 1000:1, preferably 50:1 to about 500:1, and most preferably about 100:1 to about 300:1, the prepolymerization is terminated by evaporating and purging the residual monomers from the reactor, thereby leaving the non-sticky prepolymerized catalyst as a free-flowing solid powder to be removed from the reactor.

Non-sticky Prepolymerized Catalyst Composition

The non-sticky prepolymerized catalyst of the present invention is comprised of particles that have a prepolymer portion and a catalyst portion. The prepolymer portion has up to 90 mole % ethylene, preferably about 45 to about 85 mole % ethylene, and most preferably about 60 to about 85 mole % ethylene. Also the prepolymer portion contains at least 10 mole % of one or more alpha olefins as described previously. Preferably, the prepolymer portion contains about 15 to 55 mole % alpha olefins, and most preferably about 15 to 40 mole %. The flow index of the polymer portion is less than 20 decigrams/minute, preferably less than about 5 decigrams/minute, and most preferably is less than 2 decigrams/minute. The ratio of the polymer portion to the catalyst portion is 25:1 to 1000:1, preferably 50:1 to 500:1, and most preferably is 100:1 to 300:1.

Further, the non-sticky prepolymerized catalyst of this invention has particles having a shell and a core such that the prepolymer portion is substantially contained in the shell of the non-sticky prepolymerized catalyst particle, and the catalyst portion is substantially contained in the core of the non-sticky prepolymerized catalyst particle. The shell of the non-sticky prepolymerized catalyst particle should contain at least about 75 percent by weight of the prepolymer portion, and the core of the non-sticky prepolymerized catalyst particle should contain at least about 85 percent by weight of the catalyst portion of the particle.

In general prepolymerized catalysts are known in the art. While they have been used, for example, to protect against the hot spots that can sometimes occur in the gas phase polymerization of ethylene such catalysts are not known to provide adequate protection under more severe conditions, such as polymerizations above the sticking temperature of the polymer being made.

In the present invention it has been found that in order for the prepolymer portion of a prepolymerized catalyst to provide agglomeration protection to a sticky polymer above its sticking temperature, it must have three properties: (1) it must itself be non-sticky; (2) it must be elastic, to allow for the growth and expansion of the sticky resin that it is to contain; and (3) its residues in the final resin product must not detract from the desired properties of the final sticky polymer product. Accordingly, the composition of the prepolymerized catalyst includes not just the chemical composition, but also the molecular weight, the viscosity, the crystalline content, the form or morphology and other characteristics of the complete sticky polymer resin composition, and it is this specific combination of features that is unique and not one alone. A granular prepolymerized catalyst particle that has these characteristics will allow the production of a sticky polymer in a gas phase reaction at or above the sticking temperature of the sticky polymer.

The stickiness of a particle is known to be related to its viscosity. Crystallinity and molecular weight influence this viscosity. Therefore, in general, polymers of high molecular weight are more viscous and, hence, less sticky than polymers of low molecular weight. In addition, in general, polymers of high crystallinity are more viscous and less sticky than polymers of low crystallinity. Accordingly, in the present invention, the prepolymer portion of the non-sticky prepolymerized catalyst should have a very high molecular weight, or should be highly crystalline, i.e. have a low content of alpha olefin, or both. However, highly crystalline polymers are not highly elastic, and prepolymers having a low content of alpha olefin do not provide good agglomeration protection. Further, crystallinity is undesirable in a substantially amorphous final resin product.

Therefore, the prepolymerized catalyst composition of the present invention has a prepolymer portion of low crystallinity, or high alpha olefin content, in combination with high molecular weight. This provides the required elasticity as well as the non-sticky characteristic; and the low crystallinity ensures that the non-sticky polymer will not detract from the desirable properties of the final resin product.

If necessary, the non-sticky characteristic of the prepolymerized catalyst can be further enhanced in several optional ways. Since the viscosity of the prepolymer portion near the surface of the prepolymerized catalyst particle has the greatest effect on the stickiness of that particle, a gradient in composition in the prepolymer portion can be used. By gradient is meant that the prepolymer portion near the outer surface of the prepolymerized catalyst particle is of higher viscosity than the average viscosity of the prepolymer portion, and the material away from the surface of the particle is of lower viscosity than the average. Such a gradient can involve, individually or in combination, a gradient in the molecular weight of the prepolymer portion or a gradient in the alpha-olefin content of the prepolymer portion. Alternatively, the viscosity can be further enhanced by adding an inert particulate material, as described above, to the surface of the prepolymerized catalyst.

Another aspect of the prepolymerized catalyst particle composition is the ratio of the prepolymer portion to the catalyst portion. If this ratio is small, less than about 25 grams per gram, then the prepolymer portion will not be large enough to prevent agglomeration when the final resin product is fully grown. On the other hand, if the ratio is too high, greater than about 1000 grams prepolymer portion per gram catalyst portion, then the residual prepolymer portion in the final product will be excessively high and will interfere with resin properties. The preferred ratio will be different for different catalyst systems, but will normally be in the range of about 50 to about 500 and usually in the range of about 100 to about 300 grams prepolymer portion per gram catalyst portion.

Figure 1B:
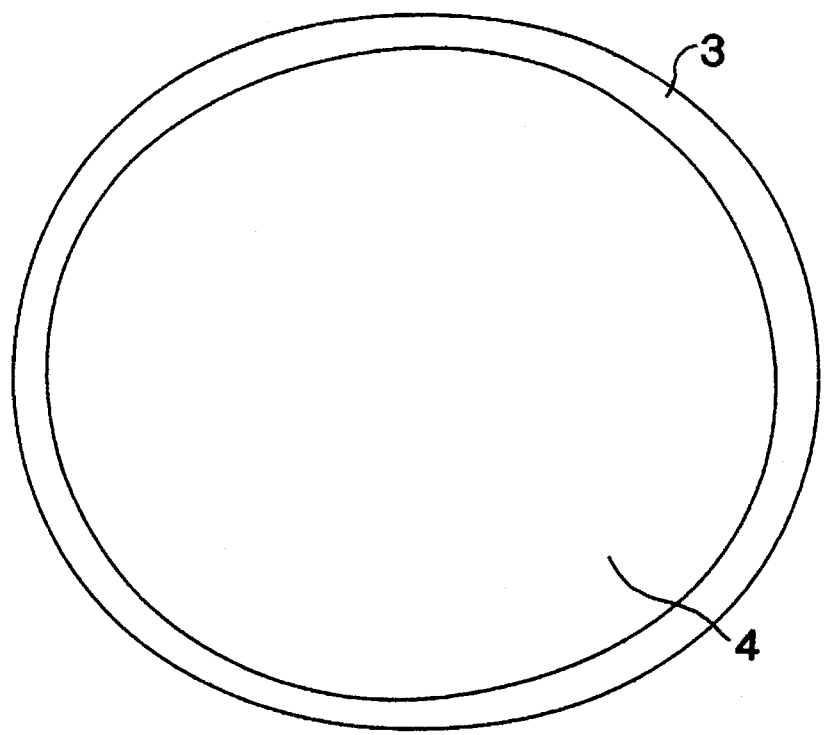
FIG. 1B is a schematic diagram of a final resin product particle in which 3 is shell comprised primarily of non-sticky polymer and 4 is core comprised primarily of sticky polymer.

Still another aspect of the prepolymerized catalyst particle composition is the morphology of the particle. For the prepolymer portion to contain the sticky polymer produced in the product polymerization, the prepolymer portion must be substantially located on the surface of the prepolymerized catalyst particle, and the catalyst portion, should be in the core of the particle. Ideally, the non-sticky prepolymerized catalyst particle should consist of a shell which is entirely prepolymer portion and a core which is entirely catalyst portion. Of course, it will be obvious to those skilled in the art that this is an ideal that can only be approached in the limit. The exact morphology will be closer or further from this ideal depending on the original morphology of the catalyst precursor before prepolymerization and on how the prepolymerization is conducted. In any prepolymerization process, some of the prepolymer portion will be produced in the core of the catalyst particle, and some of the catalyst portion will be dispersed throughout the shell of the prepolymer portion. Despite such variation, the prepolymerized catalyst particle should have a granular form in which the prepolymer portion is more highly concentrated in the shell of the particle, and in which the catalyst portion is more highly concentrated in the core of the particle. A schematic diagram of a cross-section of the resin particle is depicted in FIG. 1.

Polymerization of Resin Particle Composition

The polymerization is conducted in the gas phase, preferably in a fluidized bed made up of particulate resin. The bed is usually made up of the same granular resin that is to be produced in the reactor. The gas phase reactor can be the fluidized bed reactor described in U.S. Pat. Nos. 4,482,687; 4,994,534; 5,304,588 or another conventional gas phase reactor. The fluidized bed reactor can be operated at a temperature in the range of about 0° C. to about 100° C. and is preferably operated in the range of about 20° C. to about 70° C. A superficial velocity of about 1 to about 4.5 feet per second and preferably about 1.5 to about 3.5 feet per second can also be used in the fluidized bed. The total reactor pressure can be in the range of about 150 to about 600 psia and is preferably in the range of about 250 to about 500 psia. The ethylene partial pressure can be in the range of about 25 psi to about 350 psi and is preferably in the range of about 80 psi to about 250 psi. The gaseous feed streams of ethylene, alpha-olefin, and hydrogen are preferably fed to the reactor recycle line while diene, when employed, is preferably fed directly to the fluidized bed reactor to enhance mixing and dispersion. Feeding liquid streams into the reactor recycle line can cause a rapid buildup of a fouling layer resulting in very poor reactor operation. Polymer composition can be varied by changing the alpha-olefin/ ethylene molar ratio in the gas phase and the diene concentration in the fluidized bed. The product is continuously discharged from the reactor as the bed level builds up with polymerization. The production rate is controlled by adjusting the catalyst feed rate and the ethylene partial pressure.

The polymerization is conducted using procedures well-established in the art. The catalyst employed is the non-sticky prepolymerized catalyst of the invention, and the cocatalyst and optional promoter are chosen from those appropriate for the particular catalyst. They may or may not be the same as those employed in the prepolymerization process. For example, when producing a preferred sticky polymer, such as an EPDM, using a preferred prepolymerized catalyst, such as prepolymerized V(acetylacetonate)$_3$ catalyst, diethylaluminum chloride is used as the cocatalyst and ethyl trichloroacetate is used as the promoter. The molar ratio of propylene to ethylene is in the range of about 0.2:1 to about 4.5:1 and is preferably in the range of about 0.35: to about 3:1 The propylene/ethylene molar ratio is adjusted to control the level of propylene incorporated into the terpolymer. The molar ratio of hydrogen to ethylene is in the range of about 0.0001:1 to about 0.3:1 and is preferably in the range of about 0.0005:1 to about 0.1:1. The hydrogen/ ethylene molar ratio is adjusted to control average molecular weights. The level of diene in the bed is in the range of about 1 to about 15 percent by weight based on the weight of the bed and is preferably in the range of about 2 to about 10 percent by weight. The residence time of the mixture of resin and liquid in the fluidized bed can be in the range of about 1.5 to about 8 hours and is preferably in the range of about 2 to about 5 hours. The final EPM or EPDM product can contain the following mounts of comonomers: about 35 to about 80 percent by weight ethylene; about 18 to about 50 percent by weight propylene; and about 0 to about 15 percent by weight diene. The crystallinity, also in weight percent, can be in the range of about zero (essentially amorphous) to about 15 percent by weight (nearly amorphous). The Mooney viscosity can be in the range of about 10 to about 150, preferably about 30 to about 100. Of course, it is to be understood that production of a different sticky polymer, or use of a different prepolymerized catalyst will cause these ratios and levels and amounts to change. Such changes are well-understood by those skilled in the art of polymerization.

Resin Particle Composition

The novel resin particle of the instant invention includes a central core substantially comprised of a sticky polymer and an outer shell substantially comprised of a non-sticky polymer of high molecular weight and high comonomer content. A schematic diagram of a cross-section of the resin particle is depicted in FIG. 1.

During the course of a polymerization, the bed comprises three kinds of particles: newly introduced catalyst particles, growing resin particles and fully formed resin particles. To prevent agglomeration, each of these kinds of particles must be prevented from agglomerating. First, normal catalyst particles introduced into a reactor under conditions that produce a sticky polymer would cause other particles to stick to the growing unprotected particle, and lead to rapid agglomeration of the entire bed. In the process of the present invention, however, the prepolymerized catalyst particles that are introduced to the reactor are comprised of a high viscosity, non-sticky prepolymer surface or shell with active catalyst sites concentrated in the interior of the particle. Under polymerization conditions, sticky polymer is predominantly made in the interior of the particle, the surface remains non-sticky, and agglomeration does not take place. Second, the growing resin particle, even if protected initially by a non-sticky coating, can be brittle and fracture, leading to sticky polymer finding its way to the surface and, again, to agglomeration of the bed. This can happen, for instance, if the prepolymer portion of the prepolymerized catalyst has a high degree of crystallinity, such as an ethylene prehomopolymer. In the process of the present invention, however, the prepolymerized catalyst particles are comprised of a prepolymer portion of high comonomer content. Hence, in the growing resin particle, the shell is elastic enough to expand rather than fracture. Third, the fully formed resin particle is fully grown and expanded. But even if provided with an initial elastic non-sticky coating, if the expanded shell becomes too thin, it can break or the sticky polymer being produced can easily diffuse through to the surface, and again the bed will agglomerate. This can happen, for instance, if the prepolymer has a thin shell or is sufficently irregular to have thin spots in the shell. In the process of the present invention, however, the initial extent of prepolymerization is at least 50, preferably at least 100 grams of prepolymer per gram of catalyst precursor. Such a high degree of prepolymerization ensures that the final resin product will retain a sufficiently thick shell to provide agglomeration protection, even for those particles that may be irregularly shaped. In addition, the shell will remain a smaller fraction of the final product on a weight percent basis than a shell of the same thickness grown from a prepolymer of lower initial loading.

In the process of the present invention, then, the prepolymerized catalyst particles are comprised of an elastomeric prepolymer portion that can expand as the catalyst particle grows to form the final resin product. Thus, there should be little prepolymer in the core of the particle. However, it is always possible, and in fact does happen, that nascent particles aggregate together before growing substantially. This can happen when some prepolymerized catalyst particles do not have an adequate coating of prepolymer, for instance. When this aggregate is fully grown, its core is bound to have some non-sticky polymer that was brought in during the agglomeration phase. Therefore, the typical values for the amount of sticky polymer in the core of the resin particle are at least 90% by weight, but less than 100% by weight.

On the other hand, as the resin particle grows, the non-sticky shell thins and becomes more porous. Sticky polymer molecules will diffuse toward the surface, and the shell will become a mixture of sticky polymer and non-sticky polymer. The interface of the sticky polymer and the non-sticky polymer will normally have a high concentration of sticky polymer while the surface region will normally consist essentially of non-sticky polymer and remain non-sticky. Consequently, the typical average values of non-sticky polymer in the outer shell are higher than 80% by weight.

Although such particles may not be entirely colorless, since they can be devoid of carbon black or other prominent color or color bodies, they are capable of accepting and/or displaying color, or are colorable. The resin composition of the present invention is therefore a colorable resin particle having (A) an outer shall that is at least about 80% by weight of a non-sticky polymer having (a) up to 90 mole % ethylene and at least 10 mole % of one or more alpha olefins having 3 to 18 carbon atoms; and (b) a flow index of less than 20 decigrams/minute; and (B) an inner core of at least about 90% by weight of a sticky polymer. Preferably the resin particles are produced by a gas phase fluidized bed polymerization process at a temperature at or above the sticking temperature of the resin and the resin particles contain at least about 1 percent by weight of the non-sticky polymer.

Examples of sticky polymers, which can be produced by the invention include ethylene/propylene rubbers and ethylene/propylene/diene termonomer rubbers, high ethylene content propylene/ethylene block copolymers, poly (1-butene) (when produced under certain reaction conditions), very low density (low modulus) polyethylenes, i.e., ethylene butene rubbers or hexene containing terpolymers, an ethylene alpha-olefin copolymer having a density of 880 $kg/m^3$ to 915 $kg/m^3$, ethylene/propylene/ethylidenenorbornene, and ethylene/propylene hexadiene terpolymers of low density.

The invention is further illustrated by the following examples.

EXAMPLES

Example 1

This example illustrates prepolymerized catalyst preparation in a gas phase reactor using minimal amounts of alkyl to limit the polymerization rate, and a gradient in propylene content.

A catalyst precursor was prepared from vanadium tris(acetylacetonate) and a silica support containing 0.47 millimoles of vanadium per gram of precursor. A 50-liter, stirred, jacketed gas-phase reactor equipped with purified flow-controlled monomer feeds, a closed- loop, tempered-water temperature control system, and a vent/make-up system for pressure control was used to conduct the prepolymerization. The reactor was heated to 35° C. and charged with about 500 g of dehydrated Davison 955 silica as a start-up bed for dispersing catalyst and maintaining agitation, and not as a fluidization aid. Ethylene and propylene monomers were charged in a 0.5 molar ratio of propylene to ethylene until an ethylene partial pressure of 60 psia was reached, followed by 50 g of the catalyst precursor. Aliquots of ethyl trichloroacetate and diethylaluminum chloride were fed in the minimum amount necessary to initiate and sustain reaction, and propylene and ethylene were fed in a molar ratio of 0.25 as necessary to maintain pressure. As a consequence the molar ratio of propylene to ethylene in the reactor increased from its initial 0.5 value. The reaction was terminated when about 5000 g of monomer had been fed to the reactor, the reactor was cooled and purged with nitrogen, and the product discharged inertly (without exposure to air) and stored under nitrogen. Granular, free-flowing prepolymer was obtained, although the reactor walls were fouled with agglomerated resin. Analysis showed the prepolymer to contain 20.0 wt % propylene by nuclear magnetic resonance (NMR) analysis, 212 ppm vanadium and 2.9 wt % silicon by inductively coupled plasma (ICP) analysis, and an unmeasurably low melt flow index measured under ASTM-1238, Condition F, at 190° C. and 21.6 kg.

Examples 2–5

The following examples illustrate the excellent gas phase operability of prepolymerized catalyst with no fouling or agglomeration, with no fluidization aid added to the gas phase polymerization, and with low levels of non-sticky polymer in the final resin product so that product properties, such as cute, remain normal.

Example 2

A 1-liter stirred autoclave reactor was initially purged with nitrogen and heated to an internal temperature of 100° C. for at least 15 minutes under a slow, continuous purge of nitrogen. The reactor was cooled to 85° C. and about 200 g of sodium chloride, dried under vacuum at 115° C. for at least 12 hours, was taken from the vacuum oven while hot and added to the reactor through a 0.5-inch port under a nitrogen flow. The salt bed was stirred and purged with nitrogen for a additional 15 minutes. The reactor jacket was then cooled to 20° C.

A quantity of the prepolymerized catalyst from Example 1 containing approximately 0.03 millimole vanadium was weighed into a glass addition tube under nitrogen. Diethylaluminum chloride (DEAC) in a 240:1 DEAC/V mole ratio based on the catalyst charge and hexachloropropene (HCP) in a 5:1 HCP/V mole ratio based on the catalyst charge were mixed with 1 gram of Davison 955 silica to aid in dispersion and added to the reactor under nitrogen. The catalyst charge was added to the reactor from the addition tube and the 0.5-inch port was tightly capped. The reactor was purged briefly with nitrogen through the vent line, sealed, and the stirring speed increased to 300 rpm.

An initial quantity of 4 ml of ENB was added to the reactor. At the same time, a mixture of ethylene, propylene and hydrogen with a C3/C2 molar ratio of 1.20 and an H2/C2 ratio of 0.15 was fed to the reactor at an ethylene flow rate of 2.0 liters per minute until the reactor pressure reached 120 psig. At this point, the hydrogen feed was turned off, the C3/C2 molar ratio in the feed was adjusted to a value of 0.23, the ENB/C2 molar feed was adjusted to a rate of 0.02 and the jacket temperature was adjusted to bring the internal reactor temperature to 35° C. Additional HCP was fed to the reactor at a rate of about 0.13 millimoles per mole of C2 consumed and monomers were fed on demand to maintain pressure. The reaction was continued for 150 minutes and then terminated by stopping the flow of monomers and purging the reactor with nitrogen.

The reactor was cooled and opened to take out the mixture of salt and polymer product. The salt was washed out with water to obtain about 160 grams of granular resin. The product was free-flowing and not agglomerated and the reactor walls were not fouled. The residual amounts of prepolymerized catalyst in the resin, and the catalyst productivity, were determined by mass balance and the polymer composition was determined by NMR (nuclear magnetic resonance) analysis. The properties are set forth in Table 1.

Example 3

Example 2 was repeated except the DEAC/V ratio was increased to 400:1 and the H2/C2 ratio was decreased to 0.075. The reaction was continued for 115 minutes and 175 grams of granular resin were recovered. The product was free-flowing and not agglomerated and the reactor walls were not fouled. Additional properties are set forth in Table 1.

Example 4

Example 2 was repeated except the DEAC/V ratio was increased to 580:1. The reaction was continued for 105 minutes and 160 grams of granular resin were recovered. The product was free-flowing and not agglomerated and the reactor walls were not fouled. Additional properties are set forth in Table 1.

Example 5

Example 2 was repeated except the DEAC/V ratio was increased to 580:1 and the H2/C2 ratio was decreased to 0.10. The reaction was continued for 100 minutes and 148 grams of granular resin were recovered. The product was free-flowing and not agglomerated and the reactor walls were not fouled. Additional properties are set forth in Table 1.

TABLE 1

| Example | Agglomeration | Activity | Prepolymer Residue | Wt % C3 | Wt % ENB | Melt Flow | Mooney (est.) | Cure |
| --- | --- | --- | --- | --- | --- | --- | --- | --- |
| 2 | None | 2020 | 4% | 23.7 | 4.9 | 8 | 46 | 29.8 |
| 3 | None | 2850 | 4% | 24.3 | 3.9 | 2 | 70 | 30.5 |
| 4 | None | 2800 | 4% | 23.0 | 3.2 | 90 | 21 | 25.2 |
| 5 | None | 2750 | 5% | 23.5 | 3.9 | 17 | 53 | 30.3 |

Notes to Table:
1. Activity the amount of resin produced in grams per millimole of vanadium per hour;
2. Wt % C3 and wt % ENB = the percentages of propylene and ethylidene norbornene, respectively, in the resin as determined by $C^{13}$ NMR;
3. Melt flow = the melt index as determined under ASTM-1238, Condition F at 190° C. and 21.6 kilograms;
4. Mooney (est) = Mooney viscosity as estimated using an oscillating disk rheometer (ODR) from a linear correlation of gum Mooney viscosity under standard conditions (M(L) (minimum torque resistance)1 + 4 at 125° C.] with M(L) measured in ASTM D-3568 formula no. 1 using an ODR at 160° C. and a 1° arc at 100 cpm;
5. Cure = the difference between the maximum torque, M(H), and the minimum torque, M(L), following ASTM D-2084 test methods for the ODR, where Formula No. 1 of ASTM D-3568 is used following Procedure 6.1.2 for a miniature internal mixer and Practice D-3182.

Examples 6–8

These examples illustrate prepolymerized catalyst preparation in a gas phase reactor using controlled monomer flow to limit the polymerization rate, a gradient in propylene content and a gradient in molecular weight.

Example 6

A catalyst precursor was prepared from vanadium tris(acetylacetonate) and a silica support containing 0.47 millimoles of vanadium per gram of precursor. A 4-liter, stirred, jacketed gas-phase reactor equipped with purified, flow-controlled monomer feeds, and a steam/water temperature control system was used to conduct the prepolymerization. The reactor was baked out at 100° C. and then cooled to 30° C. and charged with about 25 g of dehydrated HiSil 233 silica as a start-up bed for dispersing catalyst and maintaining agitation, as well as serving as an inert particulate material fluidization aid. This was followed by about 2 g of the catalyst precursor, about 30 millimoles of triethylaluminum chloride and about 15 millimoles of hexachloropropene. Propylene and ethylene were then fed in a molar ratio of 0.50 until the reactor pressure reached 50 psig. Monomers were then fed in a molar ratio of propylene to ethylene of 0.25 at a rate of 1 standard liter per minute, and reactor pressure was allowed to vary. The reaction was terminated when about 250 g of monomer had been fed to the reactor, the reactor was cooled and purged with nitrogen, and the product discharged inertly and stored under nitrogen. Granular, free-flowing prepolymer was obtained. Analysis showed the prepolymer to contain 25.1 wt % propylene by nuclear magnetic resonance, and 161 ppm vanadium by inductively coupled plasma analysis. It had an unmeasurable melt flow index measured at ASTM-1238, Condition F.

Example 7

A catalyst precursor was prepared, as described above, from vanadium tris(acetylacetonate) and a silica support containing 0.47 millimoles of vanadium per gram of precursor. A 4-liter, stirred, jacketed gas-phase reactor equipped with purified, flow-controlled monomer feeds, and a steam/water temperature control system was used to conduct the prepolymerization. The reactor was baked out at 100° C. and cooled to 30° C. and charged with about 25 g of dehydrated HiSil 233 silica as a start-up bed for dispersing catalyst and maintaining agitation, as well as serving as the inert particulate material fluidization aid. This was followed by about 2.2 g of the catalyst precursor, about 25 millimoles of diethylaluminum chloride and about 15 millimoles of hexachloropropene. Propylene and ethylene were fed in a molar ratio of 0.25 at a rate of 0.30 standard liters per minute to initiate reaction. The rate was slowly increased to 1 standard liter per minute over 30 minutes, and reactor pressure was allowed to vary. Simultaneously, 200 standard cubic centimeters of hydrogen were added slowly over 30 minutes. The reaction was terminated when about 200 g of monomer had been fed to the reactor, the reactor was cooled and purged with nitrogen, and the product discharged inertly and stored under nitrogen. Granular, free-flowing prepolymerized catalyst was obtained. Analysis showed the prepolymerized catalyst to contain 300 ppm vanadium by inductively coupled plasma analysis. It had a melt flow index of 0.42 measured at ASTM-1238, Condition F.

Example 8

A catalyst precursor was prepared, as described above, from vanadium tris(acetylacetonate) and a silica support containing 0.47 millimoles of vanadium per gram of precursor. A 50-liter, stirred, jacketed gas-phase reactor equipped with purified, flow-controlled monomer feeds, a closed-loop, tempered-water temperature control system, and a vent/make-up system for pressure control was used to conduct the prepolymerization. The reactor was heated to 35° C. and charged with about 500 g of dehydrated HiSil 233 silica as a start-up bed for dispersing catalyst and maintaining agitation, as well as serving as a fluidization aid. This was followed by about 50 g of the catalyst precursor, about 250 millimoles of diethylaluminum chloride and about 35 millimoles of hexachloropropene. Propylene and ethylene were then fed in a molar ratio of 0.25 to initiate reaction, and hydrogen was added slowly until the H2/C2 ratio reached 0.002. Hydrogen feed was stopped. Monomers were fed at a rate of 3 lb/hr and reactor pressure was allowed to vary. The propylene to ethylene ratio in the reactor increased from its initial value of 0.25, and the hydrogen to ethylene ratio increased from its initial value of 0.0. The reaction was terminated when about 5000 g of monomer had been fed to the reactor, the reactor was cooled and purged with nitrogen, and the product discharged inertly and stored under nitrogen. Granular, free-flowing prepolymer was obtained, and the reactor walls were not fouled. Analysis showed the prepolymerized catalyst to contain 23.4 wt % propylene by nuclear magnetic resonance, 215 ppm vanadium and 1.8 wt % silicon by inductively coupled plasma analysis, and a melt flow index of 0.2 g per 10 rain measured at ASTM-1238, Condition F.

Examples 9–11

These examples illustrate the excellent gas phase operability of prepolymerized catalyst with no fouling or agglomeration, no additional fluidization aid, and low levels of non-sticky polymer in the resin product, even at high propylene contents and low molecular weights where the polymer produced will have maximum stickiness.

Example 9

Example 2 is repeated except the prepolymerized catalyst of Example 6 containing 0.05 millimole vanadium was used and the H2/C2 ratio used was 0.20. The reaction was continued for 160 minutes ad 143 grams of granular resin were recovered. The product was free-flowing and not agglomerated and the reactor walls were not fouled. Additional properties are set forth in Table 2.

Example 10

Example 7 was repeated with an H2/C2 charge ratio of 0.075, a C3/C2 charge ratio of 2.1 and a C3/C2 feed ratio of 0.38. The reaction was continued for 190 minutes and 189 grams of granular resin were recovered. The product was free-flowing and not agglomerated and the reactor walls were not fouled. Additional properties are set forth in Table 2.

Example 11

Example 8 was repeated with an HCP/V charge ratio of 10:1. The reaction was continued for 108 minutes and 90 grams of granular resin were recovered. The product was free-flowing and not agglomerated and the reactor walls were not fouled. Additional properties are set forth in Table 2.

TABLE 2

| Example | Agglomeration | Activity | Prepolymer Residue | Wt % C3 | Wt % ENB | Melt Flow | Mooney (est.) | Cure |
|---------|---------------|----------|--------------------|---------|----------|-----------|---------------|------|
| 9  | None   | 950  | 8% | 27.1 | 2.5 | 3.5 | 76 | 21.4 |
| 10 | None   | 1080 | 6% | 36.2 | 3.4 | 1.5 | 92 | 24.3 |
| 11 | None   | 530  | 9% | 36.9 | 3.5 | 33  | 32 | 24.0 |
| 12 | Severe | 790  | 0% | 23.0 | 0.0 | 7.5 | —  | —    |
| 13 | Severe | 1750 | 0% | 25.6 | 0.0 | 27  | —  | —    |

Notes to Table:
1. Activity = the amount of resin produced in grams per millimole of vanadium per hour;
2. Wt % C3 and wt % ENB = the percentages of propylene ad ethylidene norbornene, respectively, in the resin as determined by $C^{13}$ NMR;
3. Melt flow = the melt index as determined under ASTM-1238, Condition F at 190° C. and 21.6 kilograms;
4. Mooney (est) = Mooney viscosity as estimated using an oscillating disk rheometer (ODR) from a linear correlation of gum Mooney viscosity under standard conditions [M(L) (minimum torque resistance) 1 + 4 at 125° C.] with M(L) measured in ASTM D-3568 Formula No. 1 using an ODR at 160° C. and a 10 arc at 100 cpm;
5. Cure = the difference between the maximum torque, M(H), and the minimum torque, M(L), following ASTM D-2084 test methods for the ODR, where Formula No. 1 of ASTM D-3568 is used following Procedure 6.1.2 for a miniature internal mixer and Practice D-3182.

Comparative Examples 12–13

The following examples are comparative examples that illustrate that gas phase polymerizations using a non-prepolymerized catalyst exhibit severe fouling and agglomeration even under EPM polymerization conditions, which are the least sticky conditions due to the lack of liquid diene in the reactor.

Comparative Example 12

A supported catalyst precursor was prepared as for Example 1, but not prepolymerized. A polymerization was conducted in a similar fashion to Example 3, but this unprepolymerized catalyst containing approximately 0.035 millimole vanadium was used, no ENB was used, and the H2/C2 ratio was reduced to 0.04. The reaction was continued for 190 minutes and about 100 grams of resin were produced. However the resin was in the form of sheets and chunks and the walls were heavily fouled. The resin was not flee-flowing and had to be scraped from the reactor. Additional properties are set forth in Table 2.

Comparative Example 13

Example 12 is repeated except ethyl trichloroacetate was used as the promoter instead of hexachloropropene. The reaction was continued for 106 minutes and 116 grams of resin were produced. However the resin was in the form of sheets and chunks and the walls were heavily fouled. The resin was not free-flowing and had to be scraped from the reactor. Additional properties are set forth in Table 2.

Example 14

This example illustrates production of a non-sticky prepolymerized catalyst with an EPR prepolymer portion in a slurry of the inert diluent, isobutane, using the method of limiting monomer flow to control the rate of production of the prepolymer portion.

A catalyst precursor was prepared as in U.S. Pat. No. 4,508,842 from vanadium trichloride, tetrahydrofuran, silica and diethylaluminum chloride. A 1.5-liter, stirred, double-jacketed slurry reactor equipped with purified, flow-controlled monomer feeds and a refluxing external fluid temperature control system was used to conduct the prepolymerization. The reactor was baked out at 100° C. and then cooled to 25° C. and charged with 1.0 grams of the catalyst precursor described above. The reactor was then sealed and charged under pressure with 650 mL of dry isobutane. To the resulting slurry was then added 7.0 mL of a 25% by weight solution of triisobutylaluminum in hexane, 1.0 mL of a 1.0 mole per liter solution of 1,1-difluorotetrachloroethane in hexane, and 50 standard cubic centimeters of hydrogen gas. The temperature was then controlled at 25° C.±1° C. and monomer flows were initiated at a rate of 1.0 standard liter per minute of ethylene and 0.25 standard liters per minute of propylene. The pressure of the reactor was allowed to vary according to the monomer feed rate and polymerization rate. Polymerization was continued for 1.0 hour, at which time the reactor was depressurized, allowing all of the isobutane to evaporate from the reactor. The resulting powder was then removed from the reactor and stored under an inert atmosphere. The total non-sticky prepolymerized catalyst removed from the reactor was 105 grams. It was entirely free-flowing and had an overall propylene content of 25.1 percent by weight (as measured by infrared spectroscopy) and a flow index of 0.33 decigrams/minute (ASTM-1238, Condition F, at 190° C. and 21.6 kg). The reactor was entirely unfouled and was ready for reuse with minimal cleanup.

Examples 15–17

These examples illustrate prepolymerization in slurry in liquified ethylene and propylene, using the method of limiting the co-catalyst feed in order to limit the production rate.

Example 15

A catalyst precursor was prepared as in U.S. Pat. No. 4,508,842 from vanadium trichloride, tetrahydrofuran, silica and diethylaluminum chloride. A 1-liter, stirred, jacketed slurry reactor equipped with purified, flow-controlled monomer feeds and flowing mixed hot and cold water for heat removal and temperature control was used to conduct the prepolymerization. The reactor was baked out at 100° C. and then cooled to 25° C., and charged with 0.50 grams of the catalyst precursor described above as a 10% by weight slurry in mineral oil. The reactor was sealed and charged under pressure with 500 mL of liquid propylene. The temperature was controlled at 20° C.±1° C. and ethylene was introduced to a pressure of 420 psig, and continually fed on demand throughout the prepolymerization to maintain this pressure. Diethylaluminum chloride (25% by weight in hexane) was then added to the reactor by syringe in 0.15 mL aliquots until the inception of a low level of polymerization, represented by a flow of ethylene of about 1 standard liter per minute into the reactor and a 5° C. temperature difference across the wall of the reactor. Two such aliquots of diethylaluminum chloride were necessary. The prepolymerization was allowed to continue until about 50 grams of prepolymerized catalyst had been produced as judged by the amount of heat evolved in the prepolymerization. The reactor was then vented and the monomers allowed to evaporate from the reactor. The resulting non-sticky prepolymerized catalyst, 51.9 grams, was removed from the reactor and stored under an inert atmosphere. It was an entirely free-flowing powder, contained 25.8% by weight propylene (as measured by infrared spectroscopy) and had an unmeasurably low flow index (ASTM-1238, Condition F, at 190° C. and 21.6 kg). The reactor was entirely unfouled and could be reused with minimal cleanup.

Example 16

Prepolymerization as in Example 15 was carried out, except using 0.2 grams of catalyst precursor and at a pressure of 400 psig, and producing 44.1 grams of non-sticky prepolymerized catalyst. The prepolymer portion had a propylene content of 28.9% by weight (as measured by infrared spectroscopy), was entirely free-flowing and was removed from the reactor under non-inert conditions in air.

Example 17

The prepolymerization Example 16 was repeated, except using a catalyst precursor prepared from vanadium acetylacetonate, silica and diethylaluminum chloride and slurried in mineral oil, and using diethylaluminum chloride as the co-catalyst in place of triisobutylaluminum. From 0.1 grams of catalyst precursor was obtained 17.8 grams of granular, free-flowing non-sticky prepolymerized catalyst with a propylene content of 28.0% by weight as measured by infrared spectroscopy.

Examples 18 and 19

These examples illustrate the shell and core composition of the resin particle.

Example 18

A prepolymerized catalyst was prepared as in Example 8, except that about 500 g of dehydrated carbon black were used as the startup bed for dispersing catalyst and maintaining agitation. This made the outside of the prepolymerized catalyst particle black. The prepolymerized catalyst was isolated and an EPM polymerization was conducted in a similar manner to Example 3, but using this carbon black-containing prepolymer, an H2/C2 ratio of 0.04 and no ENB. The reaction was continued for 72 minutes to produce 40 grams of product resin. The product was free-flowing and not agglomerated, and the reactor walls were not fouled. Randomly selected particles from the sample were embedded in Buehler epoxy and allowed to cure overnight at room temperature. The embedded particles were then sectioned with a diamond blade using a Reicher-Jung Ultracut E cryogenic microtome operating at minus 60° C. to expose the region most closely representing a diametrical cross section of the particle. These cross-sectioned samples were then examined in an Olympus Vanox light microscope and a JEOL JSM-35C scanning electron microscope. All of the particles examined contained a layer of carbon black surrounding an outer shell of non-sticky prepolymer and a core of sticky EPM rubber. There was no carbon black in the interior of the particles. The thin carbon black layer served as an excellent marker to show that the prepolymerized catalyst particle had expanded with the growing resin particle and non-sticky polymer had remained on the surface to form the product composition of the instant invention.

Example 19

A prepolymerized catalyst was prepared as in Example 8, without carbon black, isolated, and an EPM polymerization was conducted in a similar manner to Example 18 except the polymerization was allowed to continue for 187 minutes to produce 113 grams of product resin. Randomly selected particles were isolated, embedded, and cross-sectioned as in Example 18 in order to reveal their cross-sectional morphology. Electron micrographs of the cross-sections were obtained. All of the particles examined revealed an outer shell of non-sticky polymer surrounding an inner core of soft, sticky polymer.

Figure 2:
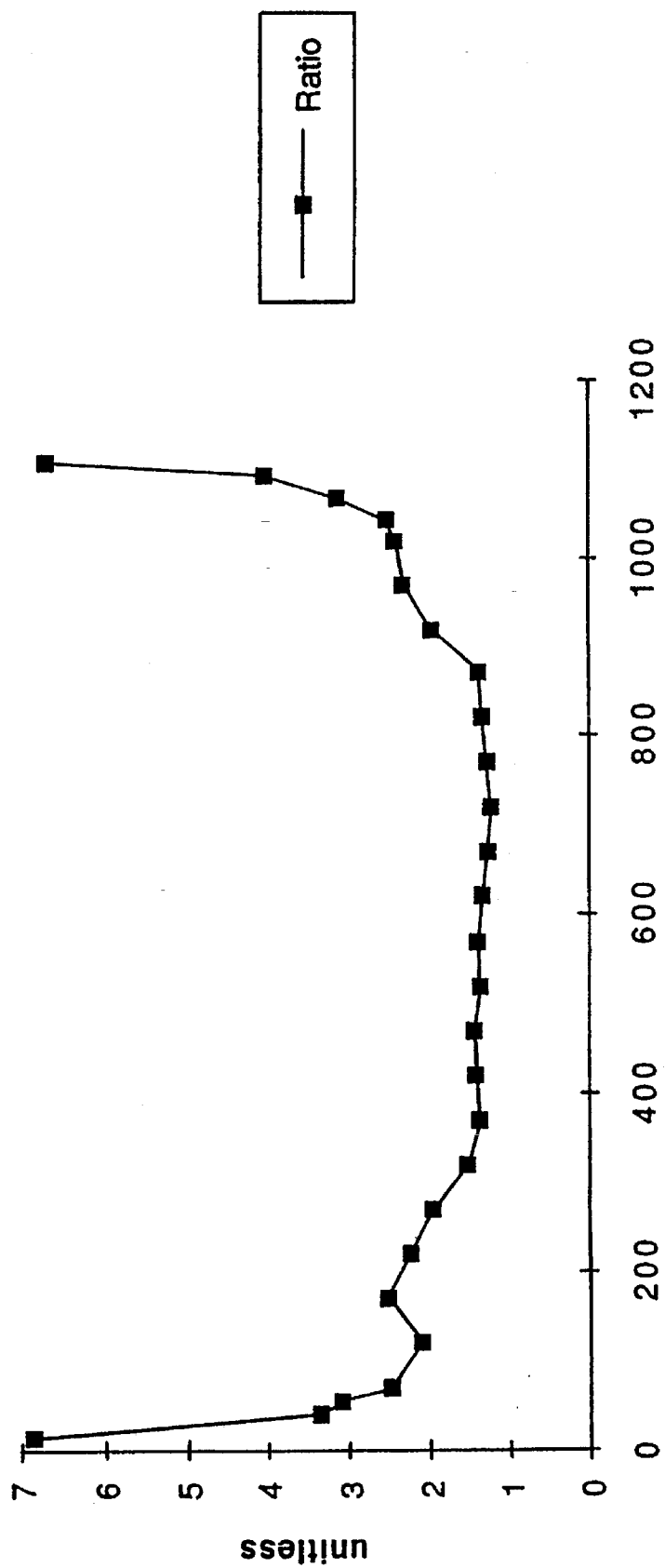
FIG. 2 is a graphic depiction of the ratio of ethylene infrared signal (722 cm−1) to propylene infrared signal (1380 cm−1) across a cross section of a final resin product particle as described in Example 19 herein.

In addition, to further characterize the product resin, one of the cross-sectioned particles was examined using a Bio-Rad UMA300A scanning infrared microscope, and the ethylene content of the particle determined as a function of the distance from the surface by measuring the ratio of the 719 cm−1 absorption due to ethylene to the 1178 cm−1 absorption due to propylene as described in ASTM Method D-3900. Spectra were recorded in steps of 25 microns for the first four measurements on either side of the cross-sectioned particle and in steps of 50 microns across the center of the particle. The results, shown in FIG. 2, show the ethylene content decreasing sharply across an outer shell of non-sticky polymer of approximately 100 microns, remaining constant at the lowest ethylene content across a across an outer shell of non-sticky polymer of approximately 100 microns, remaining constant at the lowest ethylene content across a central core of amorphous sticky polymer, then rising sharply again as the shell is reached on the other side.

Examples 20–21

These examples illustrate the production of a non-sticky prepolymerized catalyst and an EPDM resin made from it in which a fluorescent alpha olefin comonomer is incorporated in the prepolymer portion to mark the location of the prepolymer portion, and examination of the particles using fluorescence microscopy.

Example 20

A catalyst precursor was prepared as in U.S. Pat. No. 4,508,842 from vanadium trichloride, tetrahydrofuran, silica and diethylaluminum chloride. A 1.5-liter, stirred, double-jacketed gas-phase reactor equipped with purified, flow-controlled monomer feeds, and a refluxing external fluid temperature control system was used to conduct the prepolymerization. The reactor was baked out at 100° C. and then cooled to 25° C. and charged with 0.33 grams of the catalyst precursor described above. The reactor was sealed and charged under pressure with 650 mL of dry isobutane. To the resulting slurry was added 1.0 mL of 1-(7-octene-1-yl)-2-phenylindole (prepared in a manner similar to that described in Heaney, H. and Ley, S. V. *J. Chem. Soc., Perkin 1*, 1973, p. 499), 15.0 mL of a 25% by weight solution of triisobutylaluminum in hexane, 2.0 mL of a 60% by weight solution of 1,1-difluoro-1,2,2,2-tetrachloroethane in hexane, and 25 standard cubic centimeters of hydrogen gas. The temperature was controlled at 25° C.±1° C. and monomer flows were initiated at a rate of 0.33 standard liter per minute of ethylene and 0.17 standard liters per minute of propylene. The pressure of the reactor was allowed to vary according to the monomer feed rate and polymerization rate. Prepolymerization was continued for 140 minutes, at which time the reactor was depressurized, allowing all of the isobutane to evaporate to the atmosphere. The resulting powder was removed from the reactor under an inert atmosphere of dry nitrogen, washed with 1500 mL of dry, deoxygenated isopentane to remove excess unpolymerized 1-(7-octene-1-yl)-2-phenylindole, and stored under an inert atmosphere. The total non-sticky prepolymerized catalyst remaining after washing was 19.4 grams. It was entirely free-flowing and had an overall propylene content of 21.0 percent by weight (as measured by infrared spectroscopy) and a flow index of 0.33 decigrams/minute (ASTM-1238, Condition F, at 190° C. and 21.6 kg). The reactor was entirely unfouled and was ready for reuse with minimal cleanup.

Randomly selected particles from the sample are embedded in Buehler epoxy and allowed to cure overnight at room temperature. The embedded particles are then sectioned with a diamond blade using a Reicher-Jung Ultracut E cryogenic microtome operating at minus 60° C. to expose the region most closely representing a diametrical cross section of the particle. Then a 1 to 3 micrometer slice is remove with a diamond blade and mounted on a microscope slide. These cross-sectioned samples are examined in an Olympus Vanox light microscope fitted with a reflected-light ultraviolet excitation with barrier high-pass filters cutting off at either 435 nm or 455 nm for fluorescence measurement. Results indicate a core-shell particle morphology in the prepolymerized catalyst particles.

Example 21

The non-sticky prepolymerized catalyst prepared as in Example 20 was oxygenated under an atmosphere of dry oxygen as described in U.S. Pat. No. 5,322,793. Excess oxygen was removed from the prepolymerized catalyst by evacuation, and the prepolymer catalyst was stored under an atmosphere of dry nitrogen. An EPDM polymerization was conducted following the techniques of Example 2, but using 0.05 millimoles of the above prepolymerized catalyst. Diethylaluminum chloride (DEAC) in a 400:1 DEAC/V mole ratio based on the catalyst charge and ethyltrichloroacetate (ETCA) in a 10:1 ETCA/V mole ratio based on the catalyst charge were used. An H2/C2 ratio of 0.01 was used, and ETCA and ENB were continually fed to the polymerization. The polymerization was continued for 176 minutes to yield 114 grams of product resin. The product was free-flowing and not agglomerated and the reactor walls were not fouled. The resin contained 19 wt % C3 and 2.5 wt % ENB by nuclear magnetic resonance analysis.

Randomly selected particles from the sample are embedded in Buehler epoxy and allowed to cure overnight at room temperature. The embedded particles are then sectioned with a diamond blade using a Reicher-Jung Ultracut E cryogenic microtome operating at minus 60° C. to expose the region most closely representing a diametrical cross section of the particle. Then a 1 to 3 micrometer slice is remove with a diamond blade and mounted on a microscope slide. These cross-sectioned samples are examined in an Olympus Vanox light microscope fitted with a reflected-light ultraviolet excitation with barrier high-pass filters cutting off at either 435 nm or 455 nm for fluorescence measurement. Results indicate a core-shell particle morphology in the final resin particles.

What is claimed is:

1. A resin particle having
   (A) an outer shell that is at least about 80% by weight of a non-sticky polymer made from (a) 10 to 90 mole % ethylene and having at least 10 mole % of one or more alpha olefins having 3 to 18 carbon atoms, and (b) a flow index of less than 20 decigrams/minute; and
   (B) an inner core of at least about 90 percent by weight of a sticky polymer selected from the group consisting of
      (i) ethylene/propylene rubbers,
      (ii) ethylene/propylene/diene termonomer rubbers,
      (iii) high ethylene content propylene/ethylene block copolymers,
      (iv) poly (1-butene),
      (v) very low density (low modulus) polyethylenes,
      (vi) an ethylene alpha-olefin copolymer having a density of 880 kg/m$^3$ to 915 kg/m$^3$,
      (vii) ethylene/propylene/ethylidenenorbornene, and
      (viii) ethylene/propylene hexadiene terpolymers of low density;

said resin particle containing at least about 1 percent by weight of said non-sticky polymer, said resin particle being and polymerized in the absence of an inert particulate material fluidization aid above the sticking temperature of said sticky polymer.

2. The resin particle of claim 1 wherein said non-sticky polymer is about 1 to about 50 percent by weight of said resin.

3. The resin particle of claim 2 wherein said non-sticky polymer is about 1 to about 15 percent by weight of said resin.

4. The resin particle of claim 1 wherein said sticky polymer is:
   (a) an ethylene propylene rubber
   (b) an ethylene propylene diene termonomer rubber or
   (c) an ethylene alpha-olefin copolymer having a density of 880 kg/m$^3$ to 915 kg/m$^3$.

5. The resin particle of claim 4 wherein said ethylene propylene diene termonomer rubber is an ethylene propylene 5-ethylidene-2-norbornene termonomer rubber.

* * * * *